United States Patent
Sakhnini et al.

(10) Patent No.: US 12,069,674 B2
(45) Date of Patent: Aug. 20, 2024

(54) DOWNLINK AND UPLINK SCHEDULING USING RESOURCE CONFIGURATIONS

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 17/304,770

(22) Filed: Jun. 25, 2021

(65) Prior Publication Data

US 2022/0039137 A1    Feb. 3, 2022

Related U.S. Application Data (60) Provisional application No. 62/706,102, filed on Jul. 31, 2020.

(51) Int. Cl.
*H04W 72/23* (2023.01)
*H04W 72/50* (2023.01)

(52) U.S. Cl.
CPC ......... *H04W 72/23* (2023.01); *H04W 72/535* (2023.01)

(58) Field of Classification Search
None
See application file for complete search history.

(56) References Cited

U.S. PATENT DOCUMENTS

| | | | |
|---|---|---|---|
| 10,701,734 B2* | 6/2020 | Shih | H04W 74/004 |
| 10,813,137 B2* | 10/2020 | Shih | H04W 74/004 |
| 2013/0322235 A1* | 12/2013 | Khoryaev | H04L 5/1469 370/229 |
| 2017/0171848 A1* | 6/2017 | Xu | H04L 5/001 |
| 2018/0098349 A1* | 4/2018 | Sun | H04W 72/20 |
| 2018/0227088 A1* | 8/2018 | Bhattad | H04L 1/1621 |
| 2018/0233055 A1* | 8/2018 | Damnjanovic | G08G 5/0026 |
| 2018/0295631 A1* | 10/2018 | Fröberg Olsson | H04W 72/082 |
| 2018/0302895 A1* | 10/2018 | Akkarakaran | H04L 5/0082 |
| 2019/0132824 A1* | 5/2019 | Jeon | H04L 5/0092 |
| 2019/0289513 A1* | 9/2019 | Jeon | H04L 5/0098 |
| 2020/0037305 A1* | 1/2020 | Yang | H04W 72/042 |
| 2020/0107336 A1* | 4/2020 | Yang | H04L 1/0025 |
| 2021/0136736 A1* | 5/2021 | Yang | H04W 72/042 |
| 2021/0160879 A1* | 5/2021 | Lin | H04L 1/1854 |
| 2021/0274554 A1* | 9/2021 | Cozzo | H04L 1/08 |

(Continued)

FOREIGN PATENT DOCUMENTS

| | | | | |
|---|---|---|---|---|
| TW | 201409971 A | * | 3/2014 | H04L 5/0035 |
| WO | WO-2013178085 A1 | * | 12/2013 | H04B 7/2656 |
| WO | WO-2021177741 A1 | * | 9/2021 | H04W 74/004 |

*Primary Examiner* — Kodzovi Acolatse
(74) *Attorney, Agent, or Firm* — Harrity & Harrity, LLP (57) ABSTRACT

Various aspects of the present disclosure generally relate to wireless communication. In some aspects, a user equipment (UE) may receive, from a base station, downlink control information (DCI) that indicates one or more configurations for: a set of downlink resources for downlink-only communication, a set of uplink resources for uplink-only communication, or a set of downlink resources and a set of uplink resources for joint downlink and uplink communication. The UE may communicate, with the base station, based at least in part on the one or more configurations indicated by the DCI. Numerous other aspects are provided.

22 Claims, 5 Drawing Sheets

(56) References Cited

U.S. PATENT DOCUMENTS

2022/0046028 A1* 2/2022 Paavolainen .......... G06Q 40/02
2022/0322310 A1* 10/2022 Laddu ................. H04W 72/042
2023/0007702 A1* 1/2023 Park ..................... H04L 5/0094

* cited by examiner

FIG. 5

DOWNLINK AND UPLINK SCHEDULING USING RESOURCE CONFIGURATIONS

CROSS-REFERENCE TO RELATED APPLICATION

This Patent Application claims priority to U.S. Provisional Patent Application No. 62/706,102, filed on Jul. 31, 2020, entitled "DOWNLINK AND UPLINK SCHEDULING USING RESOURCE CONFIGURATIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for downlink and uplink scheduling using resource configurations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: receiving, from a base station, downlink control information (DCI) that indicates one or more configurations for: a set of downlink resources for downlink-only communication, a set of uplink resources for uplink-only communication, or a set of downlink resources and a set of uplink resources for joint downlink and uplink communication; and communicating, with the base station, based at least in part on the one or more configurations indicated by the DCI.

In some aspects, a method of wireless communication performed by a base station includes: transmitting, to a UE, DCI that indicates one or more configurations for: a set of downlink resources for downlink-only communication, a set of uplink resources for uplink-only communication, or a set of downlink resources and a set of uplink resources for joint downlink and uplink communication; and communicating, with the UE, based at least in part on the one or more configurations indicated by the DCI.

In some aspects, a UE for wireless communication includes: a memory; and one or more processors coupled to the memory, the one or more processors configured to: receive, from a base station, DCI that indicates one or more configurations for: a set of downlink resources for downlink-only communication, a set of uplink resources for uplink-only communication, or a set of downlink resources and a set of uplink resources for joint downlink and uplink communication; and communicate, with the base station, based at least in part on the one or more configurations indicated by the DCI.

In some aspects, a base station for wireless communication includes: a memory; and one or more processors coupled to the memory, the one or more processors configured to: transmit, to a UE, DCI that indicates one or more configurations for: a set of downlink resources for downlink-only communication, a set of uplink resources for uplink-only communication, or a set of downlink resources and a set of uplink resources for joint downlink and uplink communication; and communicate, with the UE, based at least in part on the one or more configurations indicated by the DCI.

In some aspects, a non-transitory computer-readable medium storing a set of instructions for wireless communication includes: one or more instructions that, when executed by one or more processors of a UE, cause the UE to: receive, from a base station, DCI that indicates one or more configurations for: a set of downlink resources for downlink-only communication, a set of uplink resources for uplink-only communication, or a set of downlink resources and a set of uplink resources for joint downlink and uplink communication; and communicate, with the base station, based at least in part on the one or more configurations indicated by the DCI.

In some aspects, a non-transitory computer-readable medium storing a set of instructions for wireless communication includes: one or more instructions that, when executed by one or more processors of a base station, cause the base station to: transmit, to a UE, DCI that indicates one or more configurations for: a set of downlink resources for downlink-only communication, a set of uplink resources for uplink-only communication, or a set of downlink resources and a set of uplink resources for joint downlink and uplink communication; and communicate, with the UE, based at least in part on the one or more configurations indicated by the DCI.

In some aspects, an apparatus for wireless communication includes: means for receiving, from a base station, DCI that indicates one or more configurations for: a set of downlink resources for downlink-only communication, a set of uplink resources for uplink-only communication, or a set of downlink resources and a set of uplink resources for joint downlink and uplink communication; and means for communicating, with the base station, based at least in part on the one or more configurations indicated by the DCI.

In some aspects, an apparatus for wireless communication includes: means for transmitting, to a UE, DCI that indicates one or more configurations for: a set of downlink resources for downlink-only communication, a set of uplink resources for uplink-only communication, or a set of downlink resources and a set of uplink resources for joint downlink and uplink communication; and means for communicating, with the UE, based at least in part on the one or more configurations indicated by the DCI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

A stationary user equipment (UE) may be associated with static channel conditions, and therefore, parameters for resource allocations for the stationary UE may be updated infrequently. While dynamic scheduling may be suitable for short resource allocations, dynamic scheduling has significant signaling overhead (e.g., large downlink control information (DCI)) and may be unnecessary for the static channel conditions of the stationary UE. Additionally, dynamic scheduling may increase downlink control signaling, thereby increasing power consumption at the stationary UE. In some aspects, a base station may schedule one or more UEs for uplink and/or downlink communication using a single DCI. In some aspects, a UE may be configured with one or more sets of resources for uplink-only communication, one or more sets of resources for downlink-only communication, and/or one or more sets of resources for joint downlink and uplink communication. Accordingly, the DCI may indicate a configuration of resources that the UE is to use for communication with the base station. In this way, control signaling overhead may be reduced.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
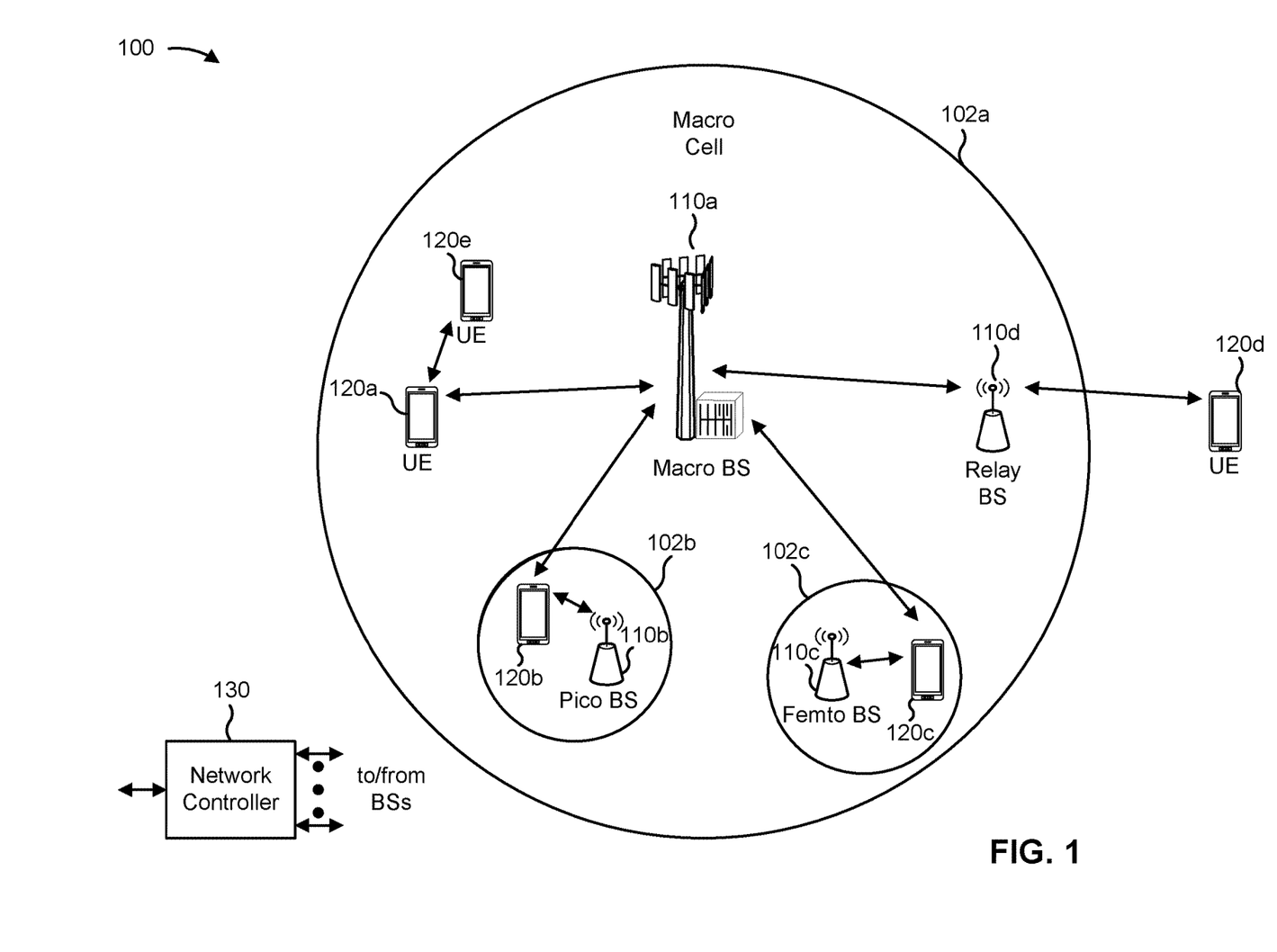
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with UEs and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
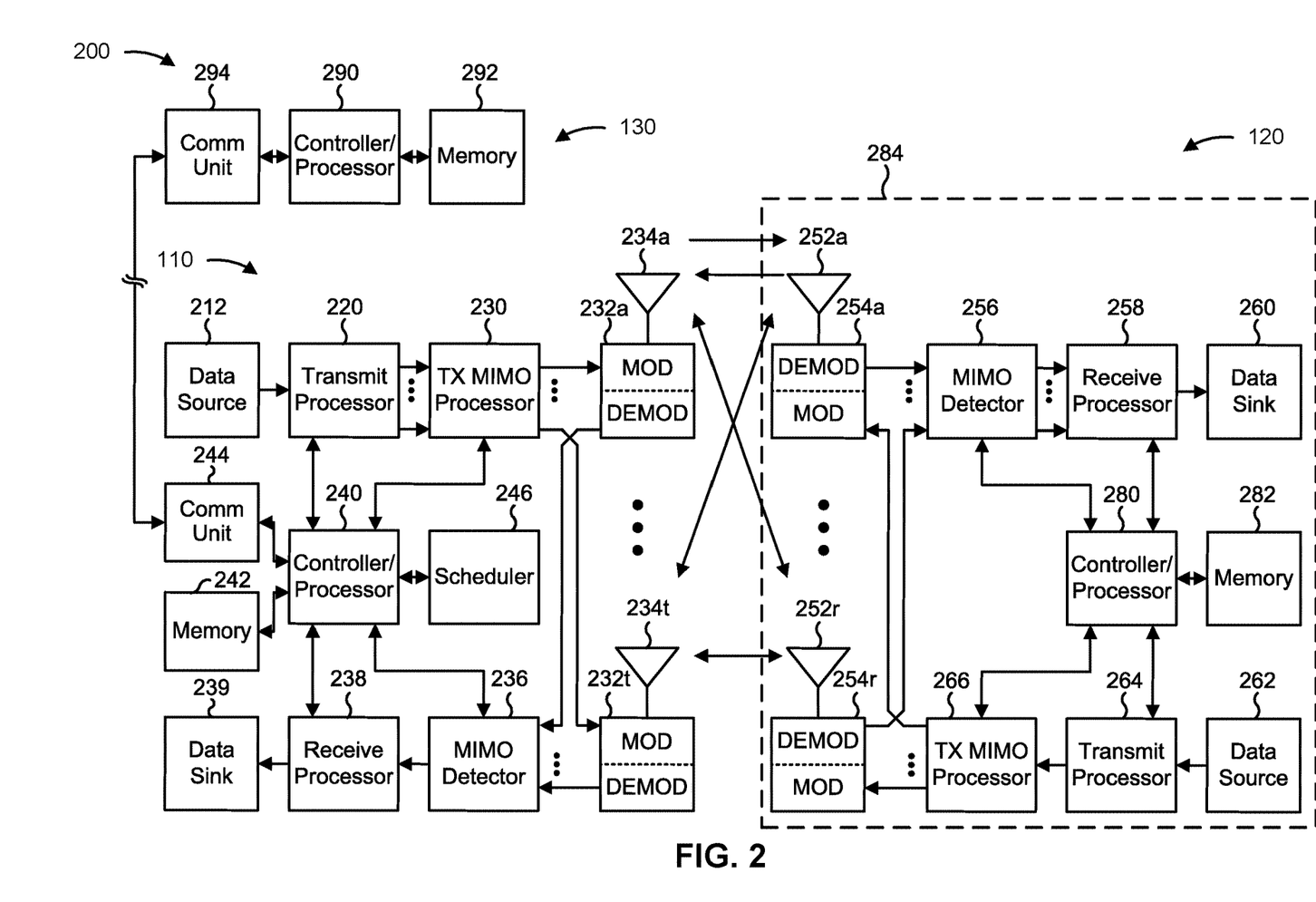
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-5).

Controller/processor 240 of base station 110, controller/processor 280 of UE 120, and/or any other component(s) of FIG. 2 may perform one or more techniques associated with downlink and uplink scheduling using resource configurations, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, UE 120 may include means for receiving (e.g., using antenna 252, DEMOD 254, MIMO detector 256, receive processor 258, controller/processor 280, and/or memory 282), from a base station, DCI that indicates one or more configurations for: a set of downlink resources for downlink-only communication, a set of uplink resources for uplink-only communication, or a set of downlink resources and a set of uplink resources for joint downlink and uplink communication, means for communicating (e.g., using antenna 252, DEMOD 254, MIMO detector 256, receive processor 258, controller/processor 280, memory 282, transmit processor 264, TX MIMO processor 266, MOD 254, and/or antenna 252), with the base station, based at least in part on the one or more configurations indicated by the DCI, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting (e.g., using transmit processor 220, TX MIMO processor 230, modulator 232, antenna 234, controller/processor 240, memory 242, and/or scheduler 246), to a UE, DCI that indicates one or more configurations for: a set of downlink resources for downlink-only communication, a set of uplink resources for uplink-only communication, or a set of downlink resources and a set of uplink resources for joint downlink and uplink communication, means for communicating (e.g., using transmit processor 220, TX MIMO processor 230, modulator 232, antenna 234, DEMOD 232, MIMO detector 236, receive processor 238, controller/processor 240, memory 242, and/or scheduler 246), with the UE, based at least in part on the one or more configurations indicated by the DCI, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Some UEs may be associated with a reduced capability relative to a baseline UE (e.g., an enhanced mobile broadband (eMBB) UE and/or the like). For example, a reduced capability (RedCap) UE, an IoT UE, an MTC UE, an NR Light UE, and/or the like, may be associated with a reduced capability relative to an eMBB UE. A RedCap UE may be used for an industrial wireless sensor, a video surveillance device, a smart wearable device, and/or the like. A RedCap UE may have a lower communicative capacity, relative to a baseline UE (e.g., an eMBB UE and/or the like). For example, a RedCap UE may be limited in terms of maximum bandwidth (e.g., 5 MHz, 10 MHz, 20 MHz, and/or the like), maximum transmission power (e.g., 20 dBm, 14 dBm, and/or the like), number of receive antennas (e.g., 1 receive antenna, 2 receive antennas, and/or the like), and/or the like. A RedCap UE may also have a prolonged battery life, relative to a baseline UE (e.g., an eMBB UE and/or the like).

In some aspects, RedCap UEs, such as industrial wireless sensors, may be associated with intensive uplink traffic, moderate reliability and latency, small packet size with a relatively long transmit interval (e.g., low data rate), and high capacity (e.g., up to one UE per square meter). For example, a RedCap UE may be characterized by an uplink-heavy traffic profile in which the RedCap UE is associated with more uplink traffic than downlink traffic. In some aspects, RedCap UEs may be stationary (e.g., RedCap UEs may be associated with a stationary mobility type).

Typically, a stationary UE may be associated with static channel conditions, and therefore, parameters for resource allocations for the stationary UE may be updated infrequently. In such cases, semi-persistent scheduling (SPS) and/or a configured grant (CG) may be used to schedule communications for the stationary UE. However, SPS and/or a CG need additional signaling for activation and deactivation, and may not be suitable for non-periodic traffic, such as short resource allocations of one or two slots. Moreover, while dynamic scheduling may be suitable for short resource allocations, dynamic scheduling has significant signaling overhead (e.g., large DCI), and may be unnecessary for the static channel conditions of the stationary UE. Additionally, dynamic scheduling may increase downlink control signaling, thereby increasing power consumption at the stationary UE.

Some techniques and apparatuses described herein enable a base station to schedule one or more UEs for uplink and/or downlink communication using a single DCI. In some aspects, a UE may be configured with one or more sets of resources for uplink-only (UL-only) communication, one or more sets of resources for downlink-only (DL-only) communication, and/or one or more sets of resources for joint downlink and uplink (DL/UL) communication. Accordingly, the DCI may indicate a configuration of resources that the UE is to use for communication with the base station. In this way, control signaling overhead may be reduced.

The base station may thus schedule one or more UEs to take advantage of known traffic patterns of the UEs. For example, a group of RedCap UEs (e.g., industrial sensors, video cameras, and/or the like) may share a use case, and therefore may simultaneously send and/or receive data according to a known pattern. Similarly, a RedCap UE (e.g., characterized by an uplink-heavy traffic profile) may send and receive data according to a known pattern, and therefore joint DL/UL scheduling may be used to further reduce control signaling overhead.

Figure 3:
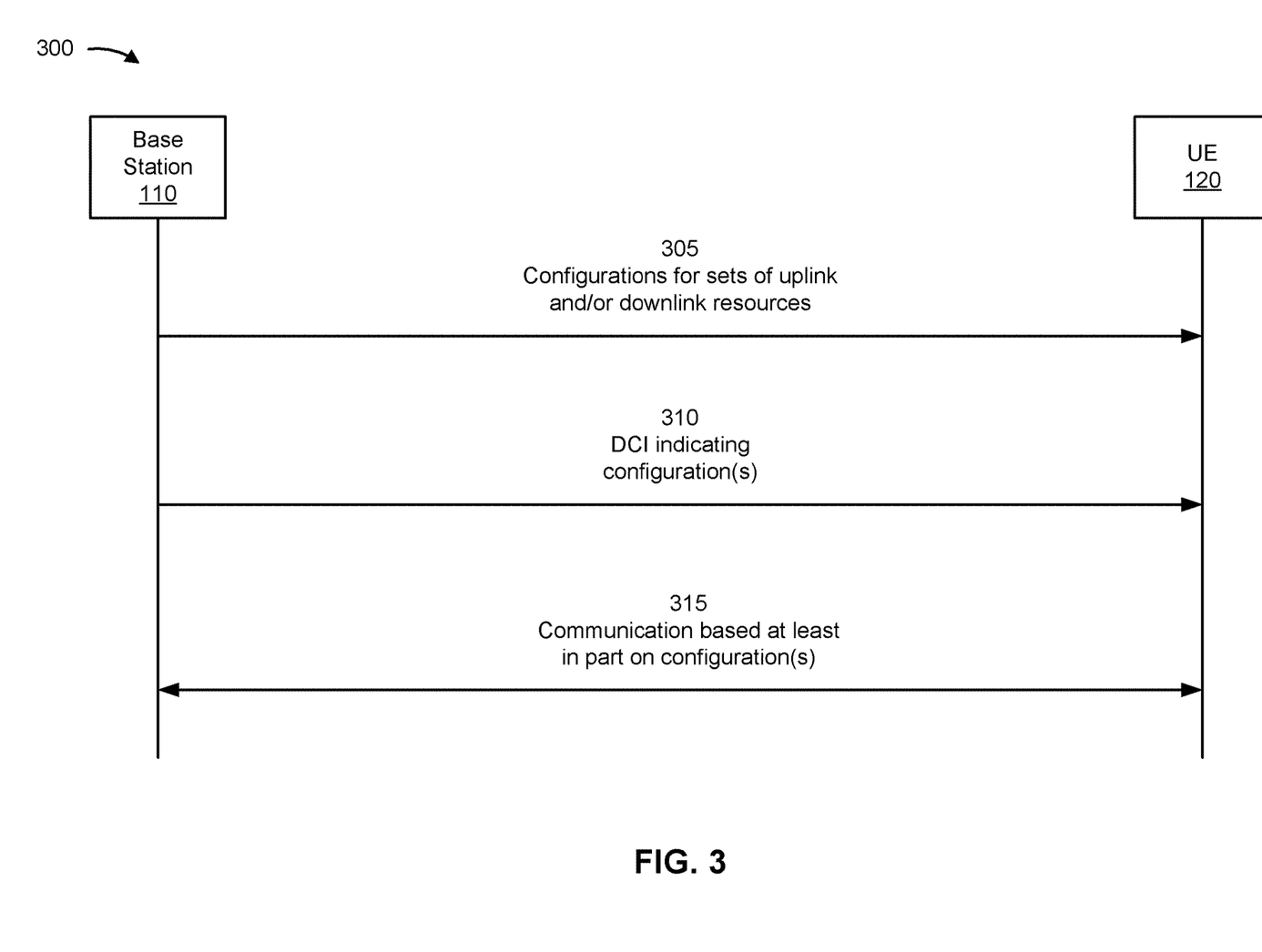
FIG. 3 is a diagram illustrating an example associated with downlink and uplink scheduling using resource configurations, in accordance with the present disclosure.

FIG. 3 is a diagram illustrating an example 300 associated with downlink and uplink scheduling using resource configurations, in accordance with the present disclosure. As shown in FIG. 3, example 300 includes communication between a base station 110 and a UE 120. In some aspects, the base station 110 and the UE 120 may be included in a wireless network, such as the wireless network 100. The base station 110 and the UE 120 may communicate on a wireless access link, which may include an uplink and a downlink.

In some aspects, the UE 120 may be a RedCap UE. For example, the UE 120 may be associated with static channel conditions, periodic traffic patterns, an uplink-heavy traffic profile, and/or the like. In some aspects, the UE 120 may be stationary (e.g., may be mounted at a fixed location, may have at least one wired connection, and/or the like).

As shown by reference number 305, the base station 110 may transmit, and the UE 120 may receive, one or more configurations for a set of downlink resources (e.g., time and frequency resources) and/or a set of uplink resources (e.g., time and frequency resources). For example, the base station 110 may transmit the one or more configurations in a radio resource control (RRC) message, a medium access control control element (MAC-CE) message, and/or the like. In some aspects, the UE 120 may be statically configured (e.g., pre-configured) with the one or more configurations, or otherwise provisioned with the one or more configurations. In some aspects, the one or more configurations may be associated with respective index values.

In some aspects, the UE 120 may be configured with one or more configurations that define one or more sets of downlink resources for DL-only communication (e.g., when the UE 120 is to receive communications but is not to transmit communications). Additionally, or alternatively, the UE 120 may be configured with one or more configurations that define one or more sets of uplink resources for UL-only communication (e.g., when the UE 120 is to transmit communications but is not to receive communications).

Additionally, or alternatively, the UE 120 may be configured with one or more configurations that define one or more sets of downlink resources and one or more configurations for one or more sets of uplink resources for joint DL/UL communication (e.g., when the UE 120 is to transmit and receive communications). For example, the one or more sets of downlink resources and the one or more sets of uplink resources may be for only joint DL/UL communication, and may not be for DL-only communication or UL-only communication. In some aspects, a configuration for a set of downlink resources and a configuration for a set of uplink resources, for joint DL/UL communication, may be associated (e.g., the set of downlink resources and the set of uplink resources may be a linked pair). In some aspects, the UE 120 may be configured (e.g., configured by the base station 110, statically configured, and/or the like) with information that identifies an association between a configuration for a set of downlink resources and a configuration for a set of uplink resources for joint DL/UL communication.

In some aspects, a set of downlink resources includes one or more reception occasions (e.g., time and frequency resources for downlink communication). In some aspects, a set of uplink resources includes one or more transmission occasions (e.g., time and frequency resources for uplink communication). In some aspects, a set of downlink resources includes a plurality of reception occasions according to SPS. That is, a configuration for a set of downlink resources may be an SPS configuration. In some aspects, a set of uplink resources includes a plurality of transmissions occasions according to a CG. That is, a configuration for a set of uplink resources may be a CG configuration.

As shown by reference number 310, the base station 110 may transmit, and the UE 120 may receive, DCI that indicates one or more of the configurations that are to be used by the UE 120. For example, the DCI may indicate a configuration for a set of downlink resources that the UE 120 is to use for DL-only communication with the base station 110. As another example, the DCI may indicate a configuration for a set of uplink resources that the UE 120 is to use for UL-only communication with the base station 110. As a further example, the DCI may indicate a configuration for a set of downlink resources and a configuration for a set of uplink resources that the UE 120 is to use for joint DL/UL communication with the base station 110.

In some aspects, the DCI may identify a configuration by an index value associated with the configuration. In some aspects, the DCI may separately indicate a configuration for a set of downlink resources (e.g., an SPS configuration) and a configuration for a set of uplink resources (e.g., a CG configuration) that are to be used by the UE 120 for joint DL/UL communication. For example, the DCI may include a first field (e.g., associated with the UE 120) to indicate a configuration for a set of downlink resources (e.g., an SPS configuration) for joint DL/UL communication, and include a second field (e.g., associated with the UE 120) to indicate a configuration for a set of uplink resources (e.g., a CG configuration) for joint DL/UL communication.

In some aspects, the DCI may jointly indicate a configuration for a set of downlink resources (e.g., an SPS configuration) and a configuration for a set of uplink resources (e.g., a CG configuration) that are to be used by the UE 120 for joint DL/UL communication. For example, the DCI may include a single field (e.g., associated with the UE 120) to indicate a configuration for a set of downlink resources (e.g., an SPS configuration) and a configuration for a set of uplink resources (e.g., a CG configuration) for joint DL/UL communication. In this case, the DCI may indicate, in the single field, a value that identifies associated configurations for sets of downlink resources and uplink resources (e.g., a value that identifies a linked pair of configurations for sets of downlink resources and uplink resources).

In some aspects, the DCI (e.g., a single DCI) may be used to simultaneously provide scheduling (e.g., indications of configurations) for one or more UEs. For example, the DCI may be a group-common DCI that schedules multiple UEs (e.g., multiple RedCap UEs associated with the same use case, such as a group of industrial wireless sensors, a group of video surveillance devices, and/or the like). In this case, the group-common DCI may include respective fields for each of the multiple UEs. For example, the group-common DCI may include one or more first fields that indicate one or more configurations for a first UE, one or more second fields that indicate one or more configurations for a second UE, and so forth, as described above.

In some aspects, the group-common DCI may indicate the same configurations for the multiple UEs, such as when the multiple UEs are to simultaneously transmit data, simultaneously receive data, and/or the like. In some aspects, the group-common DCI may indicate different configurations for the multiple UEs, such as when one or more first UEs are performing DL-only communication, one or more second UEs are performing UL-only communication, and/or one or more third UEs are performing joint DL/UL communication. In some aspects, the group-common DCI may indicate different configurations for the multiple UEs to avoid resource collision, reduce interference, and/or the like.

In some aspects, the UE 120 may use reception occasions of an indicated configuration for a set of downlink resources until the configuration is released (e.g., the UE 120 may use the reception occasions indefinitely). For example, the UE 120 may use SPS occasions of an indicated SPS configuration until the SPS configuration is released (e.g., deactivated). In some aspects, the UE 120 may use transmission occasions of an indicated configuration for a set of uplink resources until the configuration is released (e.g., the UE 120 may use the transmission occasions indefinitely). For example, the UE 120 may use CG occasions of an indicated CG configuration until the CG configuration is released (e.g., deactivated).

In some aspects, the DCI may indicate a quantity of occasions (e.g., one or more occasions) of a set of downlink resources and/or a set of uplink resources that is to be used by the UE 120 (or another UE associated with the group-common DCI) for communication with the base station 110. That is, the DCI may indicate that the UE 120 is to have a limited, rather than indefinite, use of the set of downlink resources and/or the set of uplink resources.

For example, the DCI may indicate a quantity of reception occasions (e.g., SPS occasions) of a set of downlink resources that is to be used by the UE 120 for DL-only communication. As another example, the DCI may indicate a quantity of transmission occasions (e.g., CG occasions) of a set of uplink resources that is to be used by the UE 120 for UL-only communication. As a further example, the DCI may indicate a quantity of reception occasions of a set of downlink resources, and a quantity of transmission occasions of a set of uplink resources, that are to be used by the UE 120 for joint DL/UL communication. In some aspects, a configuration for a set of downlink resources (e.g., an SPS configuration), a configuration for a set of uplink resources (e.g., a CG configuration), or another configuration may identify a quantity of occasions (e.g., SPS occasions and/or CG occasions) that is to be used by the UE 120.

In some aspects, the DCI may indicate an update to (e.g., the DCI may override) one or more parameters of the one or more configurations that are indicated for use by the UE 120 (or another UE associated with the group-common DCI). For example, the DCI may indicate an update to a bandwidth parameter, a frequency domain resource allocation parameter, a time domain resource allocation parameter, a transmission configuration indicator state parameter, a modulation and coding scheme parameter, and/or the like.

As shown by reference number 315, the base station 110 and the UE 120 may communicate based at least in part on the one or more configurations indicated by the DCI. For example, the base station 110 may transmit, and the UE 120 may receive, communications according to a configuration for a set of downlink resources indicated by the DCI. As another example, the UE 120 may transmit, and the base station 110 may receive, communications according to a configuration for a set of uplink resources indicated by the DCI.

In some aspects, the base station 110 and the UE 120 may perform DL-only communication based at least in part on a configuration for a set of downlink resources indicated by the DCI. In some aspects, the base station 110 and the UE 120 may perform UL-only communication based at least in part on a configuration for a set of uplink resources indicated by the DCI. In some aspects, the base station 110 and the UE 120 may perform joint DL/UL communication based at least in part on a configuration for a set of uplink resources and a configuration for a set of downlink resources indicated by the DCI. In this way, control signaling overhead, for communications between the base station 110 and the UE 120, may be reduced.

As indicated above, FIG. 3 is provided as an example. Other examples may differ from what is described with respect to FIG. 3.

Figure 4:
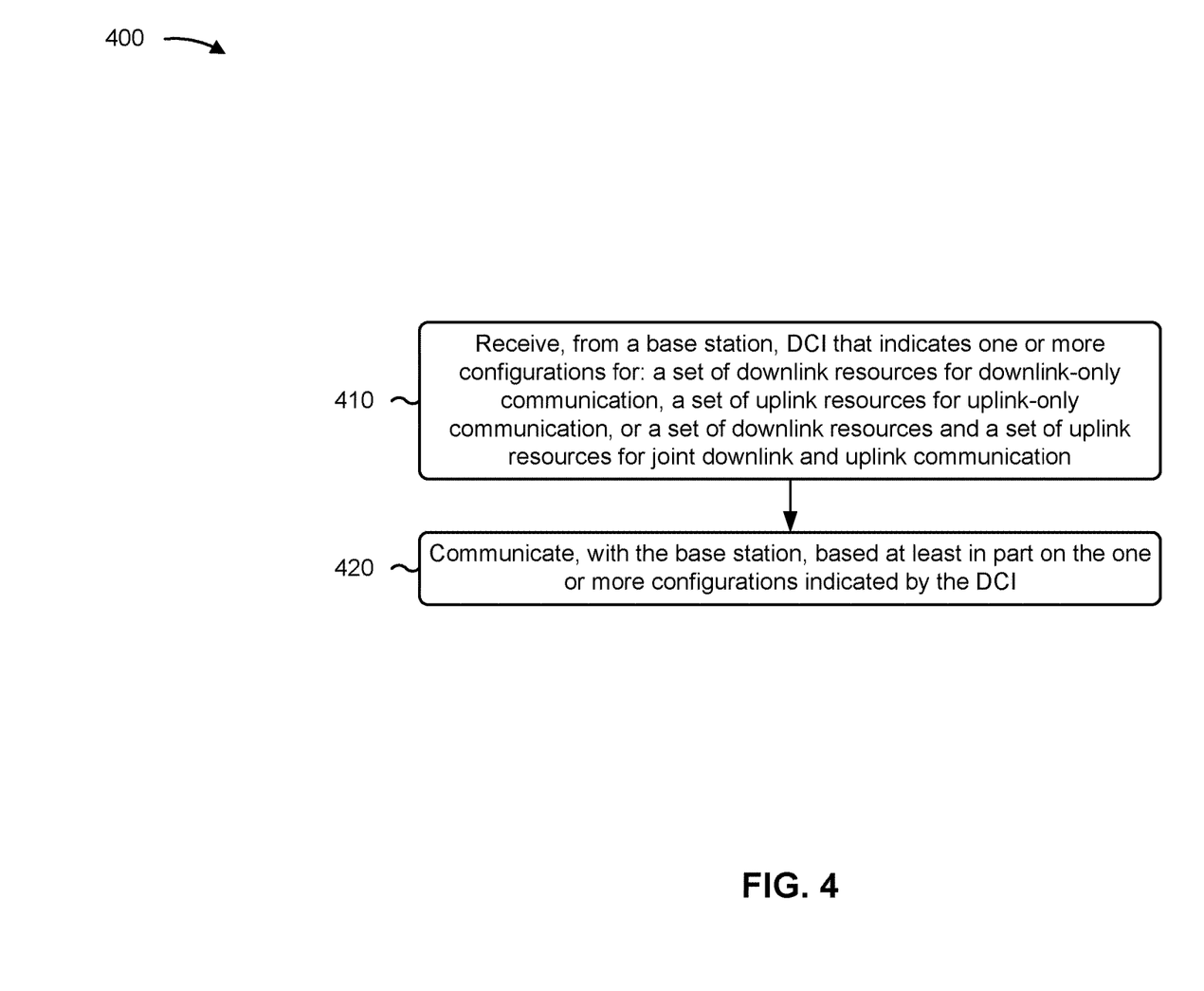
FIGS. 4 and 5 are diagrams illustrating example processes associated with downlink and uplink scheduling using resource configurations, in accordance with the present disclosure.

FIG. 4 is a diagram illustrating an example process 400 performed, for example, by a UE, in accordance with the present disclosure. Example process 400 is an example where the UE (e.g., UE 120) performs operations associated with downlink and uplink scheduling using resource configurations.

As shown in FIG. 4, in some aspects, process 400 may include receiving, from a base station, DCI that indicates one or more configurations for: a set of downlink resources for downlink-only communication, a set of uplink resources for uplink-only communication, or a set of downlink resources and a set of uplink resources for joint downlink and uplink communication (block 410). For example, the UE (e.g., using antenna 252, demodulator 254, MIMO detector 256, receive processor 258, controller/processor 280, and/or memory 282) may receive, from a base station, DCI that indicates one or more configurations for: a set of downlink resources for downlink-only communication, a set of uplink resources for uplink-only communication, or a set of downlink resources and a set of uplink resources for joint downlink and uplink communication, as described above.

As further shown in FIG. 4, in some aspects, process 400 may include communicating, with the base station, based at least in part on the one or more configurations indicated by the DCI (block 420). For example, the UE (e.g., using antenna 252, demodulator 254, MIMO detector 256, receive processor 258, transmit processor 264, TX MIMO processor 266, modulator 254, controller/processor 280, and/or memory 282) may communicate, with the base station, based at least in part on the one or more configurations indicated by the DCI, as described above.

Process 400 may include additional aspects, such as any single aspect or any combination of aspects described below and/or in connection with one or more other processes described elsewhere herein.

In a first aspect, the one or more configurations comprise one or more semi-persistent scheduling configurations, one or more configured grants, or a combination thereof.

In a second aspect, alone or in combination with the first aspect, the DCI indicates one or more index values associated with the one or more configurations.

In a third aspect, alone or in combination with one or more of the first and second aspects, the DCI is a group-common DCI for multiple UEs.

In a fourth aspect, alone or in combination with one or more of the first through third aspects, the DCI separately indicates configurations for the set of downlink resources and the set of uplink resources for joint downlink and uplink communication.

In a fifth aspect, alone or in combination with one or more of the first through fourth aspects, the DCI jointly indicates configurations for the set of downlink resources and the set of uplink resources for joint downlink and uplink communication.

In a sixth aspect, alone or in combination with one or more of the first through fifth aspects, the DCI, or the one or more configurations, indicate a quantity of occasions of the set of downlink resources for downlink-only communication, a quantity of occasions of the set of uplink resources for uplink-only communication, or a quantity of occasions of the set of downlink resources and the set of uplink resources for joint downlink and uplink communication.

In a seventh aspect, alone or in combination with one or more of the first through sixth aspects, the DCI indicates an update to one or more parameters of the one or more configurations.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
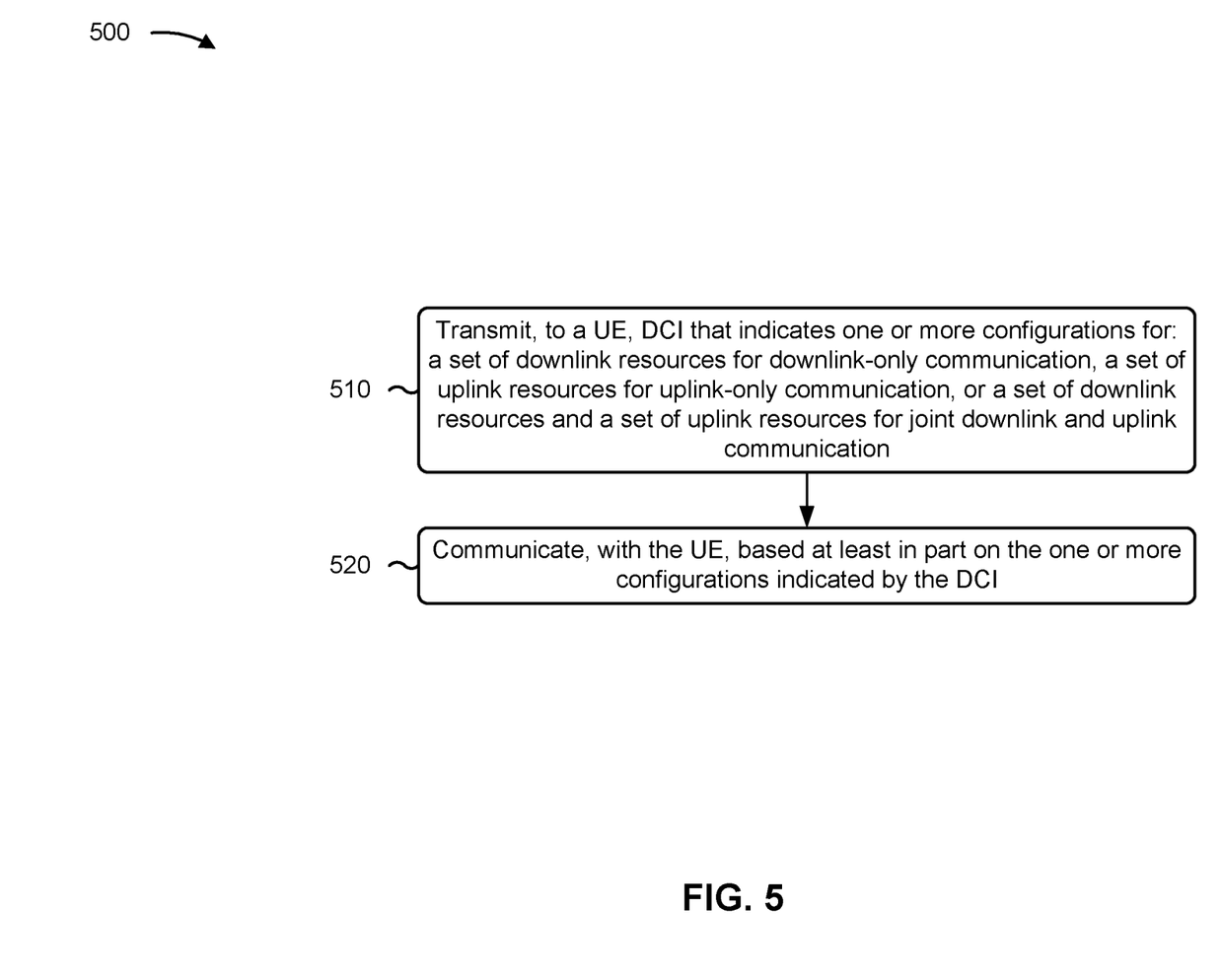

FIG. 5 is a diagram illustrating an example process 500 performed, for example, by a base station, in accordance with the present disclosure. Example process 500 is an example where the base station (e.g., base station 110) performs operations associated with downlink and uplink scheduling using resource configurations.

As shown in FIG. 5, in some aspects, process 500 may include transmitting, to a UE, DCI that indicates one or more configurations for: a set of downlink resources for downlink-only communication, a set of uplink resources for uplink-only communication, or a set of downlink resources and a set of uplink resources for joint downlink and uplink communication (block 510). For example, the base station (e.g., using transmit processor 220, TX MIMO processor 230, modulator 232, antenna 234, controller/processor 240, memory 242, and/or scheduler 246) may transmit, to a UE, DCI that indicates one or more configurations for: a set of downlink resources for downlink-only communication, a set of uplink resources for uplink-only communication, or a set of downlink resources and a set of uplink resources for joint downlink and uplink communication, as described above.

As further shown in FIG. 5, in some aspects, process 500 may include communicating, with the UE, based at least in part on the one or more configurations indicated by the DCI (block 520). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may communicate, with the UE, based at least in part on the one or more configurations indicated by the DCI, as described above.

Process 500 may include additional aspects, such as any single aspect or any combination of aspects described below and/or in connection with one or more other processes described elsewhere herein.

In a first aspect, the one or more configurations comprise one or more semi-persistent scheduling configurations, one or more configured grants, or a combination thereof.

In a second aspect, alone or in combination with the first aspect, the DCI indicates one or more index values associated with the one or more configurations.

In a third aspect, alone or in combination with one or more of the first and second aspects, the DCI is a group-common DCI for multiple UEs.

In a fourth aspect, alone or in combination with one or more of the first through third aspects, the DCI separately indicates configurations for the set of downlink resources and the set of uplink resources for joint downlink and uplink communication.

In a fifth aspect, alone or in combination with one or more of the first through fourth aspects, the DCI jointly indicates configurations for the set of downlink resources and the set of uplink resources for joint downlink and uplink communication.

In a sixth aspect, alone or in combination with one or more of the first through fifth aspects, the DCI, or the one or more configurations, indicate a quantity of occasions of the set of downlink resources for downlink-only communication, a quantity of occasions of the set of uplink resources for uplink-only communication, or a quantity of occasions of the set of downlink resources and the set of uplink resources for joint downlink and uplink communication.

In a seventh aspect, alone or in combination with one or more of the first through sixth aspects, the DCI indicates an update to one or more parameters of the one or more configurations.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method of wireless communication performed by a user equipment (UE), comprising: receiving, from a base station, downlink control information (DCI) that indicates one or more configurations for: a set of downlink resources for downlink-only communication, a set of uplink resources for uplink-only communication, or a set of downlink resources and a set of uplink resources for joint downlink and uplink communication; and communicating, with the base station, based at least in part on the one or more configurations indicated by the DCI.

Aspect 2: The method of Aspect 1, wherein the one or more configurations comprise one or more semi-persistent scheduling configurations, one or more configured grants, or a combination thereof.

Aspect 3: The method of any of Aspects 1-2, wherein the DCI indicates one or more index values associated with the one or more configurations.

Aspect 4: The method of any of Aspects 1-3, wherein the DCI is a group-common DCI for multiple UEs.

Aspect 5: The method of any of Aspects 1-4, wherein the DCI separately indicates configurations for the set of downlink resources and the set of uplink resources for joint downlink and uplink communication.

Aspect 6: The method of any of Aspects 1-4, wherein the DCI jointly indicates configurations for the set of downlink resources and the set of uplink resources for joint downlink and uplink communication.

Aspect 7: The method of any of Aspects 1-6, wherein the DCI, or the one or more configurations, indicate a quantity of occasions of the set of downlink resources for downlink-only communication, a quantity of occasions of the set of uplink resources for uplink-only communication, or a quantity of occasions of the set of downlink resources and the set of uplink resources for joint downlink and uplink communication.

Aspect 8: The method of any of Aspects 1-7, wherein the DCI indicates an update to one or more parameters of the one or more configurations.

Aspect 9: A method of wireless communication performed by a base station, comprising: transmitting, to a user equipment (UE), downlink control information (DCI) that indicates one or more configurations for: a set of downlink resources for downlink-only communication, a set of uplink resources for uplink-only communication, or a set of downlink resources and a set of uplink resources for joint downlink and uplink communication; and communicating, with the UE, based at least in part on the one or more configurations indicated by the DCI.

Aspect 10: The method of Aspect 9, wherein the one or more configurations comprise one or more semi-persistent scheduling configurations, one or more configured grants, or a combination thereof.

Aspect 11: The method of any of Aspects 9-10, wherein the DCI indicates one or more index values associated with the one or more configurations.

Aspect 12: The method of any of Aspects 9-11, wherein the DCI is a group-common DCI for multiple UEs.

Aspect 13: The method of any of Aspects 9-12, wherein the DCI separately indicates configurations for the set of downlink resources and the set of uplink resources for joint downlink and uplink communication.

Aspect 14: The method of any of Aspects 9-12, wherein the DCI jointly indicates configurations for the set of downlink resources and the set of uplink resources for joint downlink and uplink communication.

Aspect 15: The method of any of Aspects 9-14, wherein the DCI, or the one or more configurations, indicate a quantity of occasions of the set of downlink resources for downlink-only communication, a quantity of occasions of the set of uplink resources for uplink-only communication, or a quantity of occasions of the set of downlink resources and the set of uplink resources for joint downlink and uplink communication.

Aspect 16: The method of any of Aspects 9-15, wherein the DCI indicates an update to one or more parameters of the one or more configurations.

Aspect 17: An apparatus for wireless communication at a device, comprising a processor; memory coupled with the processor; and instructions stored in the memory and executable by the processor to cause the apparatus to perform the method of one or more of Aspects 1-8.

Aspect 18: A device for wireless communication, comprising a memory and one or more processors coupled to the memory, the one or more processors configured to perform the method of one or more of Aspects 1-8.

Aspect 19: An apparatus for wireless communication, comprising at least one means for performing the method of one or more of Aspects 1-8.

Aspect 20: A non-transitory computer-readable medium storing code for wireless communication, the code comprising instructions executable by a processor to perform the method of one or more of Aspects 1-8.

Aspect 21: A non-transitory computer-readable medium storing a set of instructions for wireless communication, the set of instructions comprising one or more instructions that, when executed by one or more processors of a device, cause the device to perform the method of one or more of Aspects 1-8.

Aspect 22: An apparatus for wireless communication at a device, comprising a processor; memory coupled with the processor; and instructions stored in the memory and executable by the processor to cause the apparatus to perform the method of one or more of Aspects 9-16.

Aspect 23: A device for wireless communication, comprising a memory and one or more processors coupled to the memory, the one or more processors configured to perform the method of one or more of Aspects 9-16.

Aspect 24: An apparatus for wireless communication, comprising at least one means for performing the method of one or more of Aspects 9-16.

Aspect 25: A non-transitory computer-readable medium storing code for wireless communication, the code comprising instructions executable by a processor to perform the method of one or more of Aspects 9-16.

Aspect 26: A non-transitory computer-readable medium storing a set of instructions for wireless communication, the set of instructions comprising one or more instructions that, when executed by one or more processors of a device, cause the device to perform the method of one or more of Aspects 9-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
  receiving, from a base station in a radio resource control message or a medium access control control element message, a plurality of configurations for: a set of downlink resources for downlink-only communication, a set of uplink resources for uplink-only communication, or a set of downlink resources and a set of uplink resources for joint downlink and uplink communication;
  receiving, from the base station, downlink control information (DCI) that indicates one or more configurations of the plurality of configurations that are to be used by the UE, wherein:
    the one or more configurations are based at least in part on a traffic profile of the UE in which the UE is associated with more uplink traffic than downlink traffic;
    the UE is associated with static channel conditions; and
    the DCI indicates an update to one or more parameters of the one or more configurations, the one or more parameters comprising one or more of a bandwidth parameter, a frequency domain resource allocation parameter, a time domain resource allocation parameter, a transmission configuration indicator state parameter, or a modulation and coding scheme parameter; and
  communicating, with the base station, based at least in part on the one or more configurations indicated by the DCI,
  wherein if the plurality of configurations are for at least the set of downlink resources and the set of uplink resources for joint downlink and uplink communication, the DCI separately indicates configurations for the set of downlink resources and the set of uplink resources for joint downlink and uplink communication.

2. The method of claim 1, wherein the one or more configurations comprise one or more semi-persistent scheduling configurations, one or more configured grants, or a combination thereof.

3. The method of claim 1, wherein the DCI indicates one or more index values associated with the one or more configurations.

4. The method of claim 1, wherein the DCI is a group-common DCI for multiple UEs.

5. The method of claim 1, wherein the DCI, or the one or more configurations, indicate a quantity of occasions of the set of downlink resources for downlink-only communication, a quantity of occasions of the set of uplink resources for uplink-only communication, or a quantity of occasions of the set of downlink resources and the set of uplink resources for joint downlink and uplink communication.

6. A method of wireless communication performed by a base station, comprising:
  transmitting, to a user equipment (UE) in a radio resource control message or a medium access control control element message, a plurality of configurations for: a set of downlink resources for downlink-only communication, a set of uplink resources for uplink-only communication, or a set of downlink resources and a set of uplink resources for joint downlink and uplink communication;
  transmitting, to the UE, downlink control information (DCI) that indicates one or more configurations of the plurality of configurations that are to be used by the UE, wherein:
    the one or more configurations are based at least in part on a traffic profile of the UE in which the UE is associated with more uplink traffic than downlink traffic;

the UE is associated with static channel conditions; and the DCI indicates an update to one or more parameters of the one or more configurations, the one or more parameters comprising one or more of a bandwidth parameter, a frequency domain resource allocation parameter, a time domain resource allocation parameter, a transmission configuration indicator state parameter, or a modulation and coding scheme parameter; and communicating, with the UE, based at least in part on the one or more configurations indicated by the DCI, wherein if the plurality of configurations are for at least the set of downlink resources and the set of uplink resources for joint downlink and uplink communication, the DCI separately indicates configurations for the set of downlink resources and the set of uplink resources for joint downlink and uplink communication.

7. The method of claim 6, wherein the one or more configurations comprise one or more semi-persistent scheduling configurations, one or more configured grants, or a combination thereof.

8. The method of claim 6, wherein the DCI indicates one or more index values associated with the one or more configurations.

9. The method of claim 6, wherein the DCI is a group-common DCI for multiple UEs.

10. The method of claim 9, wherein the group-common DCI indicates different configurations for the multiple UEs.

11. The method of claim 6, wherein the DCI, or the one or more configurations, indicate a quantity of occasions of the set of downlink resources for downlink-only communication, a quantity of occasions of the set of uplink resources for uplink-only communication, or a quantity of occasions of the set of downlink resources and the set of uplink resources for joint downlink and uplink communication.

12. A user equipment (UE) for wireless communication, comprising:
one or more memories; and
one or more processors, coupled to the one or more memories, configured to cause the UE to:
receive, from a base station in a radio resource control message or a medium access control control element message, a plurality of configurations for: a set of downlink resources for downlink-only communication, a set of uplink resources for uplink-only communication, or a set of downlink resources and a set of uplink resources for joint downlink and uplink communication;
receive, from the base station, downlink control information (DCI) that indicates one or more configurations of the plurality of configurations that are to be used by the UE, wherein:
the one or more configurations are based at least in part on a traffic profile of the UE in which the UE is associated with more uplink traffic than downlink traffic;
the UE is associated with static channel conditions; and
the DCI indicates an update to one or more parameters of the one or more configurations, the one or more parameters comprising one or more of a bandwidth parameter, a frequency domain resource allocation parameter, a time domain resource allocation parameter, a transmission configuration indicator state parameter, or a modulation and coding scheme parameter; and
communicate, with the base station, based at least in part on the one or more configurations indicated by the DCI,
wherein if the plurality of configurations are for at least the set of downlink resources and the set of uplink resources for joint downlink and uplink communication, the DCI separately indicates configurations for the set of downlink resources and the set of uplink resources for joint downlink and uplink communication.

13. The UE of claim 12, wherein the one or more configurations comprise one or more semi-persistent scheduling configurations, one or more configured grants, or a combination thereof.

14. The UE of claim 12, wherein the DCI is a group-common DCI for multiple UEs.

15. The UE of claim 12, wherein the DCI, or the one or more configurations, indicate a quantity of occasions of the set of downlink resources for downlink-only communication, a quantity of occasions of the set of uplink resources for uplink-only communication, or a quantity of occasions of the set of downlink resources and the set of uplink resources for joint downlink and uplink communication.

16. The UE of claim 12, wherein the DCI indicates one or more index values associated with the one or more configurations.

17. A base station for wireless communication, comprising:
one or more memories; and
one or more processors, coupled to the one or more memories, configured to cause the base station to:
transmit, to a user equipment (UE) in a radio resource control message or a medium access control control element message, a plurality of configurations for: a set of downlink resources for downlink-only communication, a set of uplink resources for uplink-only communication, or a set of downlink resources and a set of uplink resources for joint downlink and uplink communication;
transmit, to the UE, downlink control information (DCI) that indicates one or more configurations of the plurality of configurations that are to be used by the UE, wherein:
the one or more configurations are based at least in part on a traffic profile of the UE in which the UE is associated with more uplink traffic than downlink traffic;
the UE is associated with static channel conditions; and
the DCI indicates an update to one or more parameters of the one or more configurations, the one or more parameters comprising one or more of a bandwidth parameter, a frequency domain resource allocation parameter, a time domain resource allocation parameter, a transmission configuration indicator state parameter, or a modulation and coding scheme parameter; and
communicate, with the UE, based at least in part on the one or more configurations indicated by the DCI,
wherein if the plurality of configurations are for at least the set of downlink resources and the set of uplink resources for joint downlink and uplink communication, the DCI separately indicates configurations for the set of downlink resources and the set of uplink resources for joint downlink and uplink communication.

18. The base station of claim 17, wherein the one or more configurations comprise one or more semi-persistent scheduling configurations, one or more configured grants, or a combination thereof.

19. The base station of claim 17, wherein the DCI is a group-common DCI for multiple UEs.

20. The base station of claim 19, wherein the group-common DCI indicates different configurations for the multiple UEs.

21. The base station of claim 17, wherein the DCI, or the one or more configurations, indicate a quantity of occasions of the set of downlink resources for downlink-only communication, a quantity of occasions of the set of uplink resources for uplink-only communication, or a quantity of occasions of the set of downlink resources and the set of uplink resources for joint downlink and uplink communication.

22. The base station of claim 17, wherein the DCI indicates one or more index values associated with the one or more configurations.

\* \* \* \* \*